United States Patent [19]

Strong

[11] 4,158,316
[45] Jun. 19, 1979

[54] CHAIN-DRIVE TRANSMISSION

[76] Inventor: Grant H. Strong, 1407 Sunset, Richland, Wash. 99352

[21] Appl. No.: 833,327

[22] Filed: Sep. 14, 1977

[51] Int. Cl.² .................. F16H 9/00; F16H 9/24; F16H 11/08
[52] U.S. Cl. ................. 74/217 S; 74/217 C; 192/48.91; 192/53 B
[58] Field of Search ............... 74/217 S, 217 C, 522.5, 74/469, 473 R, 665 GE; 192/48.91, 53 B

[56] References Cited

U.S. PATENT DOCUMENTS

| | | | |
|---|---|---|---|
| 989,037 | 4/1911 | Pearson | 192/53 B |
| 1,316,590 | 9/1919 | Neville | 192/53 B |
| 1,777,480 | 10/1930 | Schoonmaker | 192/53 B |
| 1,884,695 | 10/1932 | Holmes | 192/53 B |
| 1,899,953 | 3/1933 | Goeser | 74/217 C |
| 1,957,550 | 5/1934 | Motter | 74/473 |
| 2,186,999 | 1/1940 | Stone et al. | 74/217 C |
| 2,240,737 | 5/1941 | Young | 74/217 C |
| 2,427,292 | 9/1947 | Mathes | 192/53 B |
| 3,587,799 | 6/1971 | Chamberland | 192/53 B |

FOREIGN PATENT DOCUMENTS 589163   5/1958   Italy ........................ 192/53 B

*Primary Examiner*—Samuel Scott
*Assistant Examiner*—William R. Henderson
*Attorney, Agent, or Firm*—J. Winslow Young; H. Ross Workman

[57] ABSTRACT

A chain-drive transmission including two sets of a plurality of sprockets, each set rotatably mounted on a rotatable shaft. Sprockets on each shaft are paired with a corresponding sprocket on the other shaft and are joined by the drive chain. The diameters of each pair of sprockets are selectively predetermined so as to provide a desired speed range for the chain-drive transmission. A selector and interlock mechanism is also provided so as to suitably select and interlock each preselected sprocket with its respective shaft thereby transmitting torque between the two rotatable shafts through the chain.

7 Claims, 2 Drawing Figures

CHAIN-DRIVE TRANSMISSION

BACKGROUND

1. Field of the Invention

This invention relates to transmissions and, more particularly, to a chain-drive transmission.

2. The Prior Art

A transmission is basically an apparatus for providing a plurality of speed ranges for transmitting a torque or force between a prime mover and a utilization site such as wheels, or the like. The conventional transmission includes a plurality of gears which may be selectively intermeshed to provide the desired speed transformation. However, the conventional gear-type transmission, by its nature, tends to be heavy, expensive to manufacture and maintain, and detract from the overall efficiency of the prime mover. For example, with respect to efficiency, the conventional transmission is bathed in oil and, therefore, each set of rotating gears becomes, in effect, a "gear pump" for the oil in the oil bath. Accordingly, a large proportion of the energy transmitted into the gear-type transmission is dissipated by the various gears in their pumping action of the oil bath.

In view of the foregoing, it is believed that it would be a significant advancement in the art to provide a chain-drive transmission which substantially eliminates all gears while, simultaneously, providing a transmission which is relatively inexpensive to manufacture and maintain, lightweight, and reduces friction losses inherent in the gear-type transmission. Such an invention is disclosed and claimed herein.

BRIEF SUMMARY AND OBJECTS OF THE INVENTION

The present invention relates to a chain-drive transmission wherein pairs of a plurality of individual sprockets are each rotatably mounted upon a rotatable shaft. Each of the sprockets is freely rotatable upon the shaft thereby reducing frictional losses. Selector and interlocking means are provided for selectively interlocking a predetermined sprocket pair to the respective shafts, thereby providing the necessary rotational interlock between the sprocket and the shaft for the purpose of transmitting torque through the chain between the two rotatable shafts. A synchronous meshing system is also included in the chain-drive transmission for providing a smooth interlock of each preselected sprocket with its respective rotatable shaft.

It is, therefore, a primary object of this invention to provide improvements in chain-drive transmissions.

Another object of this invention is to provide a chain-drive transmission wherein each sprocket is freely rotatable with respect to the shaft and each sprocket is adapted to be selectively interlocked with the shaft by a selector means.

Another object of this invention is to provide a chain-drive transmission having a synchronous meshing apparatus to provide for the synchronous meshing of a preselected sprocket with the rotatable shaft.

These and other objects and features of the present invention will become more fully apparent from the following description and appended claims taken in conjunction with the accompanying drawing.

DETAILED DESCRIPTION OF THE PREFERRED EMBODIMENTS

Figure 1:
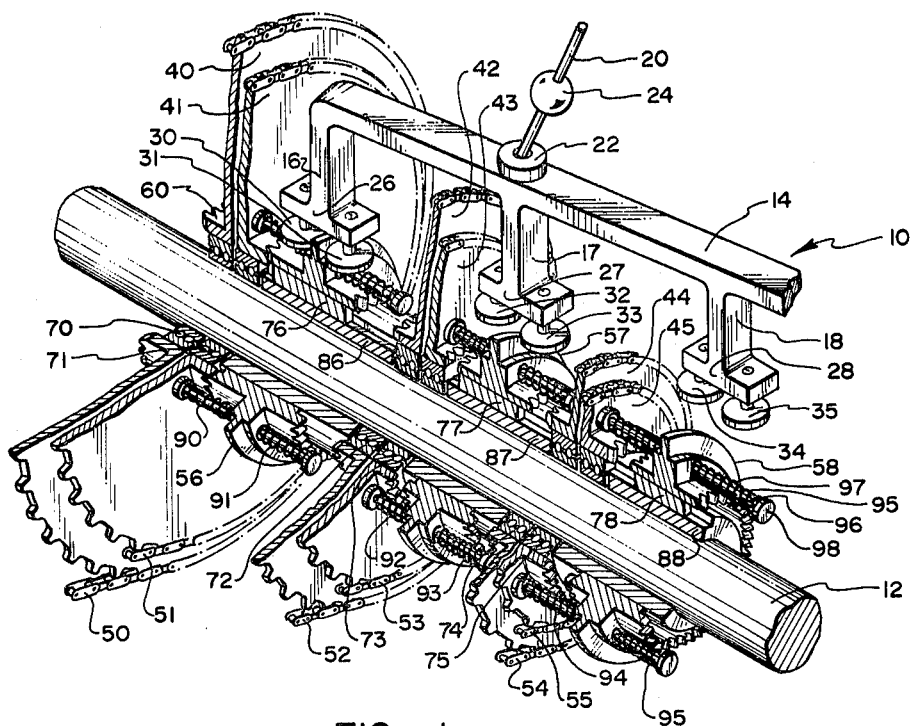
FIG. 1 is a perspective view of one half of the chain-drive transmission of this invention with portions broken away for sake of clarity.

Referring now more particularly to the drawing, only one half of the chain-drive transmission of this invention is shown herein generally as transmission 10 since it is to be particularly understood that the remaining one half of the transmission will be essentially a mirror image of transmission 10. Accordingly, inclusion of the remaining half of transmission 10 would be unnecessarily repetitive and render the drawing and the description of the same complicated and unduly prolix.

Transmission 10 includes a rotatable shaft 12 as shown and has a plurality of sprockets 40-45 mounted thereon. Each of sprockets 40-45 are shown with a different diameter, the different diameters accommodating a different speed range, respectively, for each of sprockets 40-45.

Mounted upon sprockets 40-45 are a plurality of drive chains, 50-55, respectively. Chains 50-55 interconnect each of the foregoing sprockets 40-45, respectively, with a corresponding set of sprockets (not shown) mounted upon a corresponding rotatable shaft (not shown) of the other half or transmission 10. The sprockets (not shown) which correspond with sprockets 40-45 would, most probably, have a single diameter for the purpose of providing the desired speed ranges for the transmission of this invention. Clearly, however, any suitable diameter for the corresponding sprockets (not shown) would be chosen to provide the appropriate speed ranges for the transmission 10 of this invention.

In the illustrated embodiment, since the sprockets 40-45 are of different diameters, the shaft 12 would, most probably, be interconnected with a set of wheels, or the like, versus a prime mover such as an internal combustion engine or the like. The foregoing is the most probable arrangement since it is generally an accepted practice to connect the prime mover with the sprockets of equal diameter (not shown) versus the sprockets 40-45 of the different diameters. In either event, it should be particularly understood that the chain-drive transmission 10 is suitably enclosed and provided with an adequate lubrication system such as an oil spray system (not shown) or the like for suitably maintaining the lubrication thereof and to eliminate, to the extent possible, the introduction of foreign objects or substances which would interfere with the operation and life of chain-drive transmission 10.

Each of sprockets 40-45 is rotatably mounted upon the shaft 12 by means of bearings 70-75, respectively. Bearings 70-75 allow each of sprockets 40-45, respectively, to freely rotate with respect to rotation of shaft 12 thereby substantially minimizing unnecessary rotation of any of sprockets 40-45, respectively, and the corresponding frictional losses associated therewith.

As a part of the mechanism for interlocking each of sprockets 40-45 with shaft 12, each of sprockets 40-45 includes a sprocket ring gear 60-65, respectively, formed or attached as as an integral part thereof. In the particular example illustrated herein, each of sprocket ring gears 60-65 is formed as an annular rim extending perpendicularly from the plane of the sprocket and concentric with the axis of the sprocket.

It should be particularly noted that each of the sprockets 40-45 is mounted in pairs with sprockets 40 and 41 forming a first pair, sprockets 42 and 43 forming a second pair, and sprockets 44 and 45 forming a third pair. Each sprocket in each pair of sprockets is formed as substantially a mirror image of the other. For example, sprocket ring gear 60 of sprocket 40 extends outwardly to the left whereas sprocket ring gear 61 of sprocket 41 extends outwardly to the right thereby allowing each of sprockets 40 and 41 to be placed in juxtaposition. Bearings 70 and 71 are also placed in juxtaposition. Similar features are also found with respect to the second pair of sprockets, sprockets 42 and 43, and the third pair of sprockets, sprockets 44 and 45. Although sprocket ring gears 60-65 and shaft ring gears 66-68 are shown to be wide for sake of clarity, they need be only as wide as, or slightly wider than, the gear teeth height, the width depending on whether the ring gears are formed or attached, respectively, to the sprockets and shaft ring gear base.

Sprocket ring gears 60-65 each have a plurality of intermeshing teeth which accommodate the selective intermeshing with the teeth of shaft ring gears 66-68, respectively thereby interlocking each of sprockets 40-45, respectively, to shaft 12. Although the intermeshing teeth illustrated herein are shown as having a triangular profile, no claim is being made to any specific tooth design. Moreover, those skilled in the art will readily ascertain that other, conventional teeth designs may be more suitable. For example, it may be preferable to provide teeth with intermeshing surfaces which are parallel to the axis of shaft 12 thereby substantially eliminating the tendency for the torque forces to push the intermeshed teeth apart.

Shaft ring gears 66-68 are mounted on sleeves 86-88, respectively. Sleeves 86-88 are non-rotatably mounted on shaft 12. Shaft ring gears 66-68 are interlocked with sleeves 86-88, respectively, by means of a spline/keyway combination 76-78, respectively. In this manner, shaft ring gears 66-68 are non-rotatably mounted to shaft 12. Splines 76-78 prermit shaft ring gears 66-68 to be axially slidable on sleeves 86-88, respectively, and therefore, relative to shaft 12. Axial movement to shaft ring gears 66-68 is limited in travel to engagement with the corresponding sprocket ring gears 61-65, respectively, on each side thereof.

Shaft ring gears 66-68 are formed with a set of ring gears on each side shown herein, for example, as ring gears 66a and 66b on each side of shaft ring gear 66. Similar ring gears 67a and 67b can be found on shaft ring gear 67 as well as ring gears 68a and 68b on shaft ring gear 68. Ring gears 66a and b-68a and b serve to suitably interlock shaft ring gears 66-68, respectively, to the appropriate facing sprocket ring gears 61-65, respectively. With particular reference to shaft ring gear 66, the teeth of ring gear 66a are shown engaged or otherwise intermeshed with the teeth of sprocket ring gear 61 of sprocket 41. Thus intermeshed, sprocket 41 is interlocked with shaft ring gear 66 and, in turn, with shaft 12.

Shaft ring gears 66-68 include thereon centrally disposed, annular flanges 56-58, respectively. Flanges 56-58 serve as engagement sites for axially moving of shaft ring gears 66-68, respectively, in the appropriate directions to thereby suitably engage the corresponding sprocket ring gears 61-65, respectively, as set forth hereinbefore. Detents (not shown) or equivalent means keep shaft ring gears 66-68 centered between the respective sprocket ring gear pairs when not engaged by the apparatus of selector arm 14 engaging annular flanges 56-58, respectively.

The selector means of this invention includes a selector arm 14 having a plurality of downwardly depending legs 16-18 terminating in feet 26-28, respectively. A pair of guide wheels 30 and 31 is rotatably mounted on foot 16 while corresponding pairs of guide wheels 32 and 33 are mounted on foot 27 and guide wheels 34 and 35 are mounted on foot 28. The respective pairs of guide wheels 30-35 are configured to sequentially engage flanges 56-58, respectively, for the purpose of moving the respective shaft ring gears 66-68 axially into engagement with the appropriate sprocket ring gears 61-65, respectively.

Figure 2:
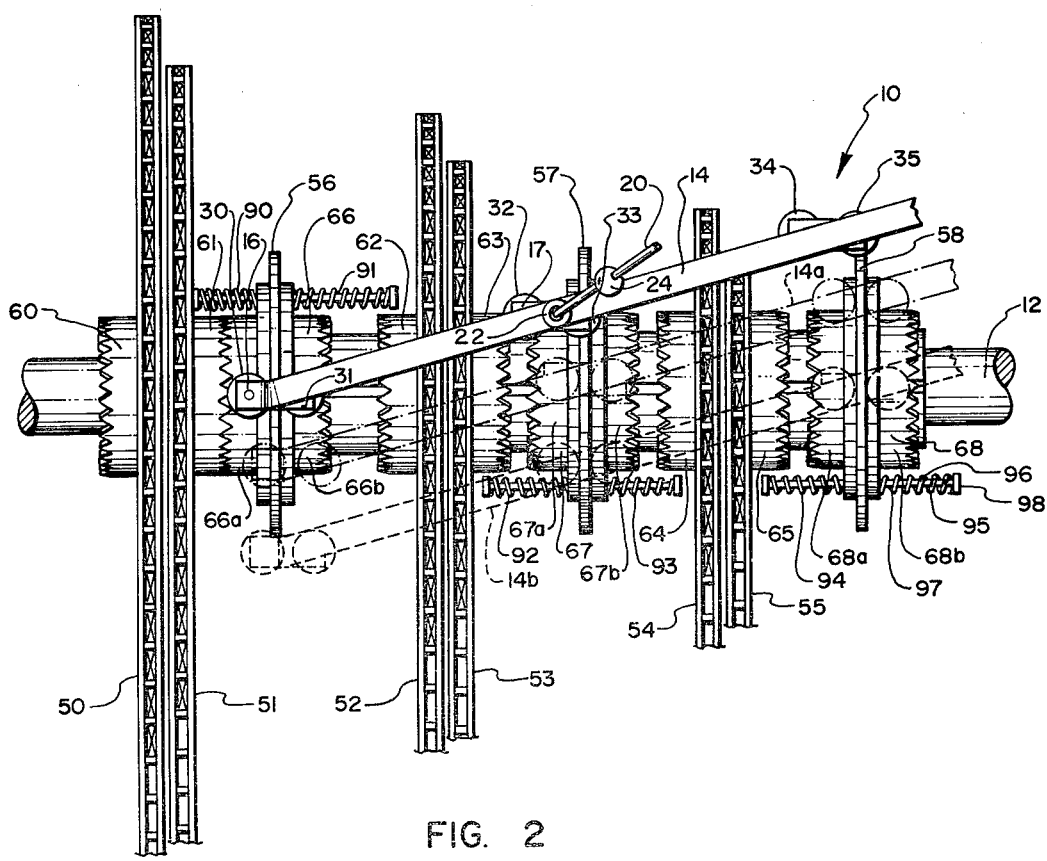
FIG. 2 is a plan view of one half of the chain-drive transmission of FIG. 1.

With particular reference to FIG. 2, it should be noted that the axis of selector arm 14 is offset from the axis of shaft 12. The offset configuration of arm 14 accommodates lateral movement of selector arm 14 relative to shaft 12 thereby moving each pair of guide wheels 30-35 tangentially into engagement with the respective flanges 56-58. This is more particularly shown in the broken line configurations of 14a and 14b.

The solid line configuration of selector arm 14 (FIG. 1) is illustrated with guide wheels 30 and 31 in engagement with flange 56. Futhermore, selector arm 14 is shifted laterally to the left so as to move shaft ring gear 66 and, more particularly, ring gear 66a, axially into engagement with sprocket ring ger 61. Disengagement of ring gear 66a from sprocket ring gear 61 is accomplished by moving selector arm 14 and, correspondingly, guide wheels 30 and 31 to the right in a direction parallel to the axis of shaft 12. As shifted, shaft ring gear 66 and, correspondingly, flange 56 will be centered between sprockets 41 and 42 in a manner similar to that illustrated for flange 57 and shaft ring gear 67.

Engagement of the mechanism of selector arm 14 with respect to flange 57 is shown in broken lines as selector arm 14a. Under these conditions, guide wheels 32 and 33 are bracketed over flange 57 by being moved transversely or tangentially relative to shaft 12. In this configuration, guide wheels 30 and 31 are laterally offset from and thereby not engaged with flange 56. Correspondingly, guide wheels 34 and 35 have not yet reached engagement with flange 58. Accordingly, shaft ring gear 67 is engaged by selector arm 14 (position 14a) and can be moved either to the left into engagement with sprocket ring gear 63 or to the right into engagement with sprocket ring gear 64. Recentering of flange 57 and shaft ring gear 67 between sprockets 43 and 44 permits the selector arm 14 to again be moved from its offset or lateral position to either the position illustrated at the solid lines for selector arm 14 or further to the position indicated by the broken lines of selector arm 14b whereby guide wheels 34 and 35 are centered over flange 58 of shaft ring gear 68.

It should, therefore, be noted that the shifting sequence of the apparatus of this invention is readily accomplished by movement of selector arm 14 relative to shaft 12 a preselected distance followed by an axial movement either left or right as may be predetermined relative to shaft 12 to bring the appropriate shaft ring gear into engagement with the desired sprocket ring gear. The tangential/axial movement of selector arm 14 accommodates the sequential engagement of a plurality of flanges 56–58. Additionally, other flanges (not shown) may be selectively engaged by selector arm 14. Clearly, of course, although only three flanges, flanges 56–58, are shown herein, any suitable number of flanges may be placed on shaft 12 between an appropriate number of sprockets to thereby provide the desired number of speed ranges for the chain-drive transmission of this invention.

Movement of selector arm 14 in the desired direction so as to bring the appropriate pairs of guide wheels 30–35 into engagement with the selected flanges 56–58, respectively, is accomplished by a selector lever 20. Selector lever 20 engages selector arm 14 in a socket 22 and passes through a ball joint 24. Appropriate support mechanism (not shown) suitably engages ball joint 24. Where necessary, additional linkage (not shown) can further be supplied for accommodating the appropriate lateral and axial movement of selector arm 14 as set forth hereinbefore.

Each of sprockets 40–45 is mounted so as to be essentially "free wheeling" relative to rotation of shaft 12 until suitably interlocked therewith by the appropriate interlocking mechanism provided by shaft ring gears 66–68, respectively. Engagement between the appropriate sprocket and shaft ring gear is greatly facilitated by the inclusion of a synchronous meshing apparatus shown herein as double-acting plungers 90–95 mounted on the base of flanges 56–58, respectively. For example, the double-acting plunger on flange 56 is shown as plungers 90 and 91 while the double-acting plunger on flange 57 is shown as plungers 92 and 93, and the double-acting plunger on flange 58 is shown as plungers 94 and 95. With particular reference to plunger 95, the portion of the double-acting plunger apparatus extending to the right of disc 58 includes a shaft 96 terminating in a head 98 and being resiliently urged away from disc 58 by means of a spring 97.

Plunger 94 includes a corresponding apparatus as a mirror image of plunger 95 to thereby generally balance the forces of the springs tending to resiliently urge the appropriate heads away from the centrally located flanges. It should be particularly noted that each of the plungers is formed as the respective end of a single shaft passing freely through the particular flange. For example, with particular reference to plungers 90 and 91 passing through flange 56, it will be seen that plunger 90 is foreshortened by being resiliently urged into frictional engagement with sprocket 41. Correspondingly, the opposite end or plunger 91 extends to the right of flange 56 an incremental distance corresponding with the distance with which plunger 90 has been depressed.

The synchronous meshing apparatus of this invention provides a means whereby a frictional engagement with the appropriate sprocket is attained prior to engagement of the respective teeth of the sprocket ring gears and shaft ring gears. For example, movement of flange disc 56 to the left causes plunger 90 and, more particularly, the enlarged head thereof to frictionally engage the surface of sprocket 41 to thereby synchronize the angular rotation of sprocket 41 with that of shaft ring gear 66 and, correspondingly, shaft 12. It should be particularly noted that the frictional engagement of sprocket 41 by plunger 90 occurs prior to engagement of sprocket ring gear 61 with shaft ring gear 66 to thereby substantially reduce any clashing of the meshing gears. Clearly, a plurality of the synchronous meshing apparatus of plungers 91–95 are radially and uniformly arrayed on each of shaft ring gears 66–68, respectively, to provide the proper balance thereto.

The invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by a United States Letters Patent is:

1. A chain-drive transmission comprising:
   a rotatable shaft;
   a plurality of sprockets rotatably mounted on the shaft, each sprocket having a different outside diameter to provide the transmission with a plurality of speed ranges corresponding with the outside diameters of the sprockets;
   interlocking means for interlocking a preselected sprocket to the shaft, the interlocking means comprising a sprocket ring gear fabricated as an integral part of the sprocket and a shaft ring gear non-rotatably mounted on the shaft and axially slidable on the shaft to accommodate engagement with the sprocket ring gear, the shaft ring gear further comprising an annular flange, the annular flange accommodating engagement with the selector means, the selector means axially moving the shaft ring gear into engagement with the sprocket ring gear; and
   selector means for actuating the interlocking means wherein the selector means comprises a pair of guide wheels adapted to bracket the annular flange, the guide wheels bracketing the annular flange and pressing against the annular flange in rolling relationship to shift the shaft ring gear axially in a preselected direction.

2. The chain-drive transmission defined in claim 1 wherein the selector means comprises a shift arm having a plurality of downwardly depending legs, each leg terminating in a foot, each foot having a pair of guide wheels mounted thereon, the shift arm residing in a plane parallel to the shaft and having an axis at an angular offset to the axis of the shaft, the angular offset accommodating tangential movement of each pair of guide wheels relative to a corresponding annular flange on a shaft ring gear so that only one pair of guide wheels is bracketed over its corresponding annular flange at any one time.

3. The chain-drive transmission defined in claim 2 wherein the shift arm includes guide means to accommodate movement of each pair of guide wheels bracketed over an annular flange in a direction parallel to the axis of the shaft, the guide wheels thereby selectively engaging and disengaging the shaft ring gear and the sprocket ring gear.

4. The chain-drive transmission defined in claim 1 wherein the shaft ring gear further comprises a plurality of spring-biased sprocket engagement means mounted on the shaft ring gear, the sprocket engagement means being adapted to frictionally engage the sprocket upon movement of the shaft ring gear toward said sprocket to thereby synchronize rotation of said sprocket with said shaft ring gear prior to interlocking the shaft ring gear with the sprocket ring gear.

5. The chain-drive transmission defined in claim 1 wherein the shaft ring gear further comprises a plurality of spring-biased sprocket engagement means mounted on the annular flange, the sprocket engagement means being adapted to frictionally engage the sprocket upon movement of the shaft ring gear toward said sprocket and thereby synchronize rotation of said sprocket with the shaft ring gear prior to interlocking the shaft ring gear with the sprocket ring gear.

6. A chain-drive transmission comprising:
   a rotatable shaft having a plurality of shaft ring gears non-rotatably mounted thereon and adapted to be axially shifted along a discrete length of the rotatable shaft;
   a plurality of sprockets rotatably mounted on the shaft and including a ring gear on each sprocket, each sprocket ring gear being adapted to being selectively engaged by a shaft ring gear; and
   selector means for actuating a preselected shaft ring gear into engagement with a predetermined sprocket ring gear the selector means comprising a plurality of pairs of guide wheels and each shaft ring gear comprises an annular flange extending disc extending beyond the periphery of the shaft ring gear and adapted to be engaged by a pair of guide wheels, the guide wheels engaging the annular flange in rolling relationship to thereby axially shift the shaft ring gear in a preselected direction.

7. The chain-drive transmission defined in claim 6 wherein the selector means comprises a shift arm having a plurality of downwardly depending legs, each leg terminating in a foot and each foot having a pair of guide wheels mounted thereon, the shift arm residing in a plane parallel to the axis of the shaft, the shift arm having an axis oriented at an angular offset to the axis of the shaft, the angular offset of the shift arm accommodating tangential movement of each pair of guide wheels relative to a corresponding annular flange on the shaft ring gear so that only one pair of guide wheels is bracketed over a corresponding annular flange at any one time.

* * * * *